US 6,763,731 B1

(12) United States Patent
Padden

(10) Patent No.: US 6,763,731 B1
(45) Date of Patent: Jul. 20, 2004

(54) DYNAMIC ERROR CORRECTING POSITIVE DISPLACEMENT PISTON FLOWMETER AND METHOD OF MEASURING GAS FLOW IN A PISTON FLOWMETER

(76) Inventor: Harvey Padden, 10 Park Pl., Butler, NJ (US) 07405

( * ) Notice: Subject to any disclaimer, the term of this patent is extended or adjusted under 35 U.S.C. 154(b) by 0 days.

(21) Appl. No.: 10/349,849

(22) Filed: Jan. 22, 2003

(51) Int. Cl.$^7$ ............................................... G01F 1/22
(52) U.S. Cl. .................................................. 73/861.57
(58) Field of Search ........................... 73/861.57, 54.04

(56) References Cited

U.S. PATENT DOCUMENTS

| | | | | |
|---|---|---|---|---|
| 4,331,033 A | * | 5/1982 | Emerson | 73/243 |
| 4,815,313 A | * | 3/1989 | Beard | 73/1.62 |
| 4,858,172 A | * | 8/1989 | Stern | 700/40 |
| 6,575,019 B1 | * | 6/2003 | Larson | 73/54.04 |

* cited by examiner

Primary Examiner—Edward Lefkowitz
Assistant Examiner—Jewel V. Thompson
(74) Attorney, Agent, or Firm—Eugene Lieberstein; Michael N. Meller; Anderson Kill & Olick, P.C.

(57) ABSTRACT

A positive displacement flowmeter comprising a cylindrical enclosure and a piston movable within the enclosure between the opposite ends of the enclosure; with the piston having a diameter closely approximating the diameter of the enclosure to form a clearance seal; means for permitting a gas, the flow of which is to be measured, into one end of the enclosure for moving said piston toward the opposite end of the enclosure, means for detecting the movement of the piston between two locations along the cylindrical enclosure, means for measuring the pressure in the cylindrical enclosure and for calculating the presence of a dynamic error, if any, during said timed interval in accordance with the following equation:

$$Error = \frac{(P_2 - P_1)}{P_1} \cdot \frac{Vm + Vd}{Vm}$$

Where $P_2$ and $P_1$ are the absolute pressures at the end and at the start of the timed interval, $V_m$ is the volume displaced during the timed interval and $V_d$ is the dead volume for the enclosure (the total contained volume between the flow source and the measured portion of the cylinder) and calculating the gas flow during the timed interval taking into account said dynamic error.

5 Claims, 3 Drawing Sheets

DYNAMIC ERROR CORRECTING POSITIVE DISPLACEMENT PISTON FLOWMETER AND METHOD OF MEASURING GAS FLOW IN A PISTON FLOWMETER

FIELD OF INVENTION

This invention relates to gas flow measuring devices of high accuracy, preferably with an accuracy of below 0.5% absolute, for use as a cost-effective primary (dimensionally traceable) flow calibration device and for calibration of other gas flow measuring devices particularly for field service application as well as for use with mass flow meters and mass flow controllers.

BACKGROUND OF INVENTION

There is a need in the industry for a precise gas flow measuring device which can accurately measure gas flow in the 1 sccm to 50,000 sccm gas flow range. The device should possess a high turndown ratio of more than 100 to one with respect to the speed of operation so that only one gas flow measuring device is needed to cover a wide range of gas flow measurements particularly for use in the field service calibration of other gas flow measuring devices. Constant-displacement systems are, perhaps, the simplest and most intuitive flow measurement devices in that they are characterized by the most basic of quantities: length and time with flow mathematically derived therefrom. A dimensionally characterized system would be as close as possible to direct traceability from national dimensional standards.

An idealized constant displacement piston flowmeter would consist of a massless, frictionless, leak proof, shape-invariant and impermeable piston inserted within the flow stream to be measured and enclosed by a perfect cylinder. In an ideal device the time that the piston takes to move a known distance between two points on the cylinder (which implies a known volume) yields the volumetric flow calculated as follows:

$$F = V/T = \pi r^2 h / T$$

Where V=displaced volume
T=elapsed time.

FIG. 1 schematically illustrates a basic automatic piston prover. Gas ordinarily passes through the bypass valve. When a reading is called for, the valve closes. The gas is then forced to pass through the cylinder, effectively inserting the piston into the flow stream. After a suitable acceleration interval. A measurement is made of the time required to pass from a first sensor to a second sensor and utilized in the foregoing equation.

There are two constant displacement flowmeters in common use; bell provers and piston provers. National laboratory level primary standard provers are large, expensive, slow and relatively non-automated calibrators Bell provers operate in a manner similar to piston provers, but the enclosed volume consists of an inverted cup-shaped bell with edges submerged in a sealing liquid, such that vertical movement of the bell changes the volume enclosed above the liquid.

A piston prover, in its most basic form, can be nothing more than a calibrated burette within which a soap-film bubble rises in response to gas flow. A stopwatch can be used to time the bubble's passage through a known volume between two marks. More modern bubble calibrators use optical bubble detection and an internal computer. The accuracy of any practical bubble device is limited by:

Vapor pressure of water
Shape variation of the bubble
Permeability of the bubble
Fluid viscosity changes with evaporation
Variation of cylinder working diameter from dried and prior-reading bubble solution The above-described uncertainties limit the usefulness of bubble devices. Vapor pressure alone can account for an inaccuracy of ±1.5% uncertainty. Bubble devices are of value when the insertion pressure must be as constant as possible, such as measurement of a very highly unregulated source.

All other bell and piston provers, although more accurate than bubble devices (on the order of 0.2%), possess significant insertion pressure. Moreover, the dynamic pressure has recently been investigated as a significant source of measurement uncertainty. Further improvement of prover accuracy, as well as achievement of conventional accuracies in smaller, faster or less expensive provers can be achieved by reducing the effect of dynamic pressure variations. Although this methodology is applicable in a similar manner to all constant-volume provers, we will illustrate its application to viscous-sealed piston provers.

Our preferred embodiment consists of a viscous-sealed piston prover. Viscous-sealed piston provers use a piston and cylinder fitted so closely that the viscosity of the gas under test results in a leakage small enough to be insignificant. For reasonable leakage rates, such a gap must be on the order of 5 to 10 microns. A portable dry piston prover permitting high piston velocities and small measurement distances is taught in U.S. Pat. No. 5,440,925 and U.S. Pat. No. 5,456,107 respectively with each disclosure being herewith incorporated by reference. In the device taught in the foregoing patents the piston and cylinder are respectively made of graphite and borosilicate glass because of their low, matched temperature coefficients of expansion and low friction and, as such, are essentially shape invariant, impermeable and virtually frictionless. There is no vapor pressure from a bubble or sealant. Although the instrument can utilize high piston speeds, resulting in a measurement repetition rate rapid enough to be considered quasi-continuous, the accuracy has heretofore been limited to a maximum of about 0.5%. The best provers have exhibited accuracies on the order of 0.2%.

The purpose of this invention is to enhance the maximum accuracy of constant-volume provers, or to allow smaller size, faster speed or lower cost for a chosen accuracy level. There is no teaching in the prior art or in the aforementioned patents of the existence of dynamic errors or how to correct for such errors.

Dynamic errors may result from dynamic pressure changes during a measuring cycle and, as such, substantially affect the accuracy of the gas flow measurement. By correcting for errors in dynamic pressure the accuracy of the device is enhanced and preferably before the device is to be standardized for statistical accuracy. The standardization procedure is itself conventional and accordingly is not elaborated upon in the subject application.

SUMMARY OF INVENTION

It has been discovered in accordance with the present invention that the accuracy of a positive displacement piston flowmeter, such as is illustrated in U.S. Pat. No. 5,440,925, can be substantially enhanced permitting an accuracy of below about 0.5% and preferably below 0.2% absolute to be readily achieved. A high precision statistical accuracy is achieved in accordance with the present invention by automatically correcting for any dynamic errors occurring in response to dynamic pressure changes during the gas flow measurement period. In fact, it has been discovered in accordance with the present invention that an error resulting from a dynamic pressure change is critical to assure measurement integrity of the instrument for use as a precision calibrator.

In accordance with the present invention the presence of an error in response to a dynamic pressure change is determined by measuring the dynamic pressure during the timing interval over which the gas flow is measured, preferably at the start and end of the timing cycle, and computing the dynamic pressure error, if any, as follows:

$$Error = \frac{(P_2 - P_1)}{P_1} \cdot \frac{Vm + Vd}{Vm}$$

Where $P_2$ and $P_1$ are the pressures at the end and the start of the timed interval, $V_m$ is the volume over-which the flow is timed and $V_d$ is the dead volume (the total contained inventory volume between the flow source and the measured portion of the cylinder). Once an error is determined to exist the computed value of the error may then be directly applied and substracted from the gas flow calculation to establish a dynamically self corrected gas flow having a highly precise accuracy for enabling the device to be used as a calibrator and to calibrate other less accurate gas flow measuring devices.

BRIEF DESCRIPTION OF THE DRAWINGS

The invention will be described with respect to the preferred embodiments thereof. Other objects, features, and advantages of the invention will become apparent when read in connection with the following drawings in which.

DETAILED DESCRIPTION OF THE INVENTION

Figure 1:
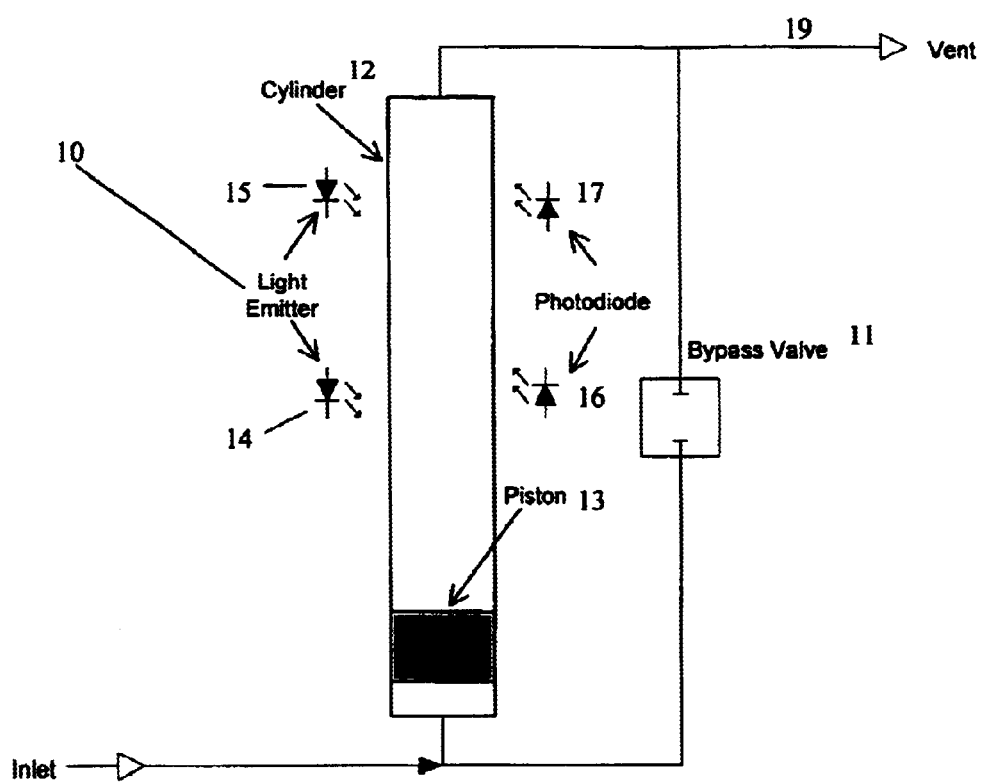
FIG. 1 is an idealized schematic diagram of a basic piston displacement flowmeter.

FIG. 1 illustrates a conventional prior art piston displacement flowmeter 10. Gas ordinarily flows through the bypass valve 11 to the outlet 19. When a reading is called for, the bypass valve 10 closes and the gas or air is permitted to pass through the cylinder 12. The incoming gas displaces the piston 13, which accelerates to the incoming gas's flow velocity. After the piston has had adequate time to accelerate a measurement is taken of the elapsed time for the gas to pass a fixed distance between a first optical sensor 14 and a second optical sensor 15. Conventional photodetectors 16 and 17 are used to detect the instant each of the photodetectors is tripped. Detector 16 starts a timer (not shown) at the start of a measuring stroke and detector 17 stops the timer 18 at the end of the measuring stroke. The flow is calculated in accordance with the following simple equation:

$$F = V/T$$

Or, $$F = \frac{\pi r^2 h}{T}$$

Where T is the displaced time and V equals velocity. The gas velocity may also be recited in terms of $\pi r^2 h$ where r is the radius of the cylinder and h is the distance displaced.

Figure 2:
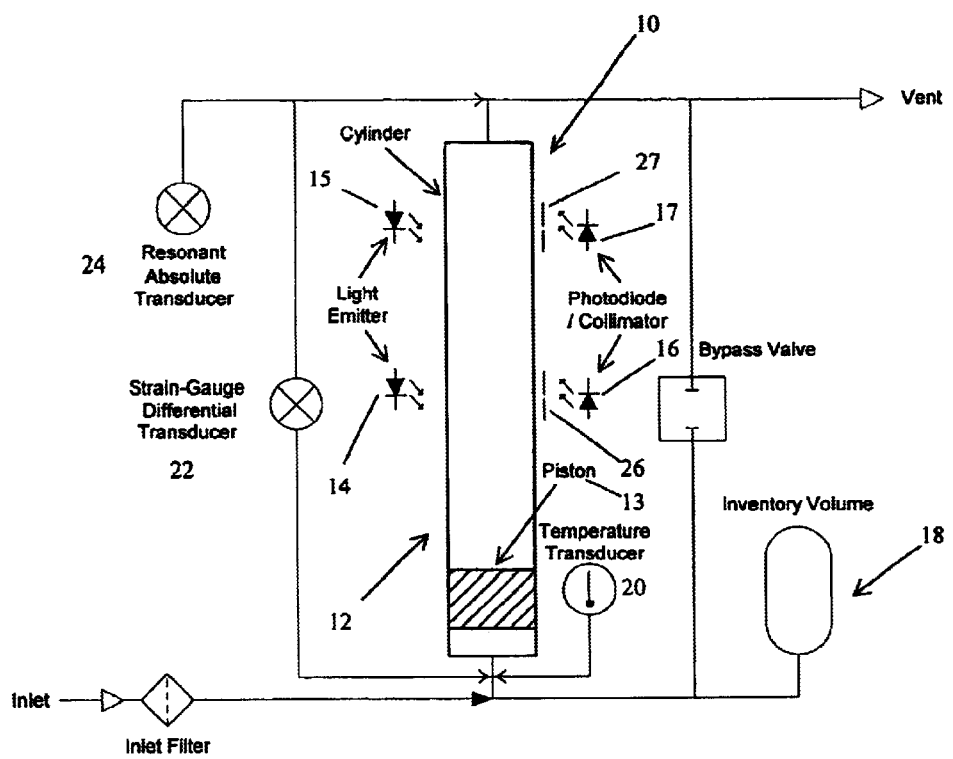
FIG. 2 is a schematic diagram of the piston displacement flowmeter of the present invention.

A schematic diagram of the piston displacement flowmeter 10 of the present invention is shown in FIG. 2 and is functionally equivalent to the operation of the flowmeter 10 of FIG. 1 consistent with the description described in U.S. Pat. No. 5,440,925, the description of which is incorporated herein by reference. The flowmeter 10 of FIG. 2 includes a cell (not shown), which consists of a machined base (not shown) containing standard inlet and outlet pneumatic fittings (not shown) for the flowmeter 10, a bypass valve 11, temperature transducer (sensor) 20 and a pressure transducer 22 or a differential pressure transducer 22 i.e. an absolute pressure transducer may be used or a differential pressure transducer. The base of the cell enables the measuring cylinder 12 and piston assembly to be vertically mounted in the flowmeter. The cylinder 12 is made of borosilicate glass and the piston 13 is made of graphite, which form a clearance-sealed piston to minimize friction. Both materials have a similar, very low coefficient of thermal expansion, allowing a precise fit to be achieved over a reasonable range of working temperatures. The effective cylinder diameter is neither the piston diameter nor the cylinder diameter; rather, it is an intermediate value differing from each by a few microns. The cell of the flowmeter 10 is interchangeable with other cells to permit different diameter cylinders and different piston assemblies to be used to increase the range of measurement. Detector slits 26 and 27 are mounted directly to the outer surface of the cylinder 12 for maximum detection repeatability. A support structure (not shown) may also be attached to the cell bottom of the flowmeter 10 to physically support the sensors, i.e., infrared light emitters and detectors, as well as the cell's electronic circuitry. Each cell contains all signal processing circuitry, A/D conversion and an EEROM for calibration data and an internal clock (all of which is conventional and as such is not shown). In this way, complete calibration (inclusive or exclusive of the computer's time base) can be performed for each individually selected cell. The bypass valve 11 is of a self-relieving, low pressure, large area design. It latches in either the open or closed position to minimize introduction of heat into the flow stream.

The same reference numbers are used to identify common components for the flowmeters of FIGS. 1 and 2. The pressure transducer 22 and the temperature transducer 20 are preferably located adjacent the entrance to the measuring cylinder 12 to maximize accuracy. The gas flow is derived, as is explained above with reference to FIG. 1, from measured primary dimensions (length and time) over a given timed interval based upon the simple equation:

$$F = V/T$$

Figure 3:
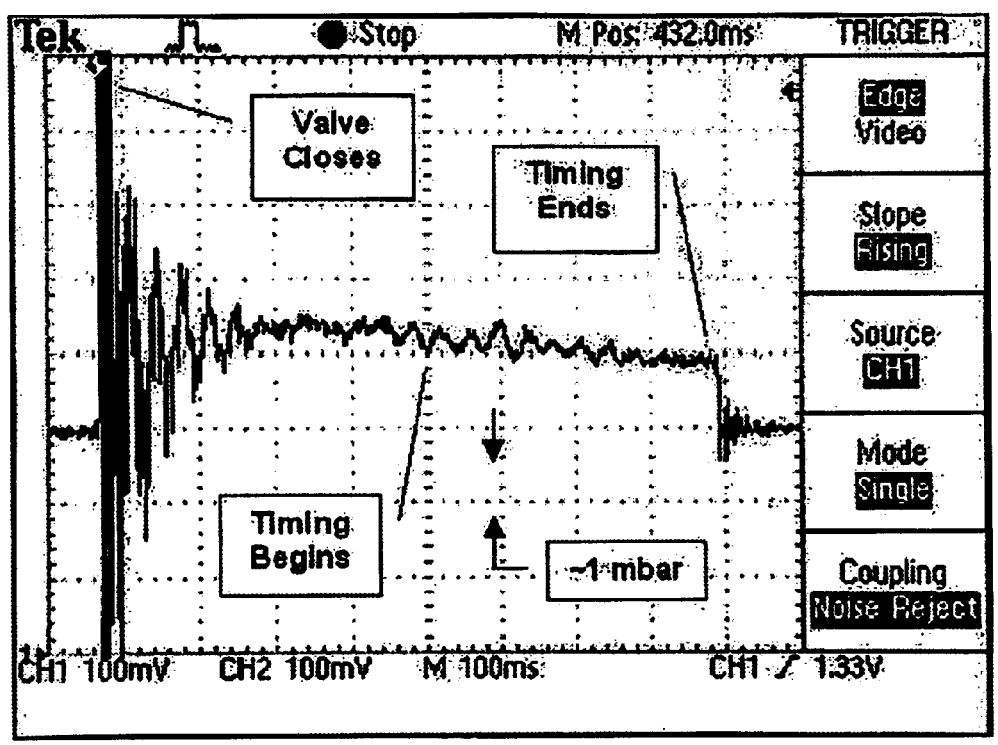
FIG. 3 is a scope trace of pressure vs. time for the piston displacement flowmeter of the present invention shown in FIG. 2.

Of course, this equation assumes ideal circumstances. In order to be generally accepted, measuring instruments must be characterized by a rigorous uncertainty analysis. All possible sources of error must be numerically characterized and a statistical analysis of the total uncertainty (error) performed. Heretofore this was limited to a static determination believed to be based either upon the assumption that no significant dynamic measuring error could exist or that if such an error existed the measuring error would be dynamically the same throughout the measuring timed interval and was not an uncertainty to be accounted for. However since a piston flowmeter is intrinsically volumetric it is potentially subject to accelerative, oscillatory and piston-jamming effects and as such internal dynamic pressures can and do result in an additional uncertainty error. In fact the actual pressure trace of FIG. 3 shows oscillations in pressure and also shows that the slope in the average pressure is not a constant. Either of these two conditions could result in serious error. Moreover if the temperature of the flowmeter is different from the temperature of the measured gas, the gas will expand or contract roughly according to the ideal Gas Law: PV=nRT. The measurement will then be inaccurate in proportion to the absolute temperature and absolute pressure.

However, if pressure increases during the measuring cycle of a constant-pressure flow meter, gas volume will decrease as the gas in both the enclosed measurement volume and in the enclosed non-measurement volume (inventory volume, consisting of dead space, piping, etc.). The decrease in volume will slow the movement of the piston, bell or other enclosing element such that additional time will be needed to reach the end-of-timing point. The net effect will be a reading that is lower than the actual flow. Uncorrected, the measured volume contains an error equal to the difference in internal pressure at the start and end of the measuring period, amplified by the ratio of dead volume to measurement volume, as well as that of the pressure within the cylinder at the end of the timed period.

In a high-speed device such as a dry piston displacement prover internal pressure changes rapidly and can significantly affect measurement uncertainty. According to the Ideal Gas Law, volume is inversely proportional to pressure. Therefore, the lost volume will be given by:

$$V_{lost} = \frac{(P_2 - P_1)}{P_1} \cdot (V_m + V_l)$$

Where:

$P_2$=absolute pressure at end of timed period
$P_1$=absolute pressure at start of timed period
$V_m$=volume of measurement (change in volume during timed interval)
$V_1$=volume of inventory (dead volume space, piping, etc.)
$V_{lost}$=volume decrease due to pressure increase We must add $V_{lost}$ to the $V_m$ in calculating flow to correct the pressure-induced error. The uncorrected flow is given by:

$$F_u = \frac{V_m}{\Delta t}$$

Where:
Fu=uncorrected flow
$\Delta t$=timed interval

Now, the corrected flow $F_c$ is given by:

$$F_c = \frac{V_m + V_{lost}}{\Delta t}$$

Substituting, $$F_c = \frac{V_m + \frac{(P_2 - P_1)}{P_1} \cdot (V_m + V_l)}{\Delta t}$$

Simplifying the equation yields:

$$F_c = V_m \cdot \left[\frac{P_2}{P_1} + \frac{P_2 - P_1}{P_1} \cdot R_v\right]$$

Where $R_v$=ratio of volumes $V_1/V_m$

Note that the difference between $P_2$ and $P_1$ is typically on the order of 0.1% of either value. Thus the result is substantially similar if an approximation is used for $P_1$ as the divisor in simple volumetric corrections. When such an approximation is used, the first ($P_2/P_1$) term in the multiplier can be replaced by unity to avoid adverse effects on overall accuracy. In the case of standardization to a fixed pressure, $P_1$ is replaced in the divisor by the standardizing pressure. In such cases, the equation can be restated as:

$$F_c = \frac{V_m}{\Delta t} \cdot \left[\frac{P_2}{P_3} + \frac{P_2 - P_1}{P_3} \cdot R_v\right]$$

Where $P_3=P_1$ or an approximation thereof, or an arbitrary value corresponding to a standardizing pressure.

The dynamic pressure error is itself computed as follows:

$$Error = \frac{(P_2 - P_1)}{P_1} \cdot \frac{Vm + Vd}{Vm}$$

Where $P_2$ and $P_1$ are the absolute pressures at the end and the start of the timed interval, $V_m$ is the volume over which the flow is timed and $V_d$ is the dead volume (the total contained volume between the flow source and the measured portion of the cylinder). The dead volume is unavoidable and consists of the inventory volume below the point at which timing beings inclusive of the inlet fitting and tubing (not shown) and interior passageway through which gas flows into the measuring cylinder 12 from a source of gas (not shown). The dead volume is readily measurable and is schematically identified in FIG. 2 by means of a single reference number 18.

The corrected flow may be normalized to ambient pressure $P_A$ (since the internal measurement pressure will be somewhat different), or to a chosen standardizing pressure $P_S$. To do so, we multiply by $P_1/P_A$ or by $P_1/P_S$. The same effect is achieved by simply substituting $P_A$ or $P_S$ for $P_1$ in the pressure correction equation.

The dynamic pressure error may be computed from the above formulae and used to correct the flow measurement automatically or the corrected flow may be computed automatically so that the dynamic uncertainty of the device due to pressure changes is accounted for, thereby enhancing the instrument's total accuracy. The computed error may also be used to display the error signal particularly if the accuracy of the device must be known relative to a preset limit. With knowledge of the dead volume, which will be constant for a given instrument design using a specified amount of external dead volume, the uncertainty resulting from the dynamic pressure differences is minimized. This approach's effectiveness is limited by the pressure measurement's total accuracy (including secondary uncertainties such as synchronicity and quantization) and the dead volume's accuracy.

A single pressure transducer 22 may be used for measuring pressure at the beginning of the timing cycle and may be referenced to ambient or to the outlet vent pressure. An optional second pressure transducer 24 such as a barometric transducer for taking an absolute measurement may be used to measure ambient or outlet vent pressure. A fast, sensitive pressure transducer may be used for transducer 22 such as a silicon transducer for taking a fast internal pressure measurement to about e.g., 1/40 atmosphere with the fast reading taken at the start and end of the timed period. The fast readings can be summed with the barometric transducer for use in deriving standardization pressures. Alternatively the transducer 22 may be a differential sensitive pressure transducer to conduct the pressure measurement and is particularly useful if the outlet vent pressure is not at ambient pressure. If at ambient, a gauge transducer is preferable. The pressure can be measured continuously or intermittently throughout the timed period and the maximum and minimum pressures determined.

FIG. 3 shows a scope trace of pressure vs. time for the device of FIG. 2. The left hand half of the trace shows the pressure response during the acceleration time of the piston before any measurement is taken. A measurement is taken in the right hand half of the trace, which is scaled at about 0.5 inch $H_2O$ per box. The oscillations, which occur during the measuring period in the right hand half of the trace, are compensated for using dynamic pressure compensation in accordance with the present invention resulting in an enhanced accuracy, which automatically accounts for and minimizes dynamic pressure uncertainties.

What is claimed is:

1. A positive displacement flowmeter comprising a cylindrical enclosure having opposite ends; a piston movable within said cylindrical enclosure with the piston having a diameter closely approximating the diameter of the enclosure to form a clearance seal; means for permitting a gas, the flow of which is to be measured, into one end of the enclosure for moving said piston from a first position near one end of the enclosure toward the opposite end of the enclosure, means for detecting the movement of the piston between a first and second location along the cylindrical enclosure, with the first location positioned a distance upstream of the first position of the piston to permit the piston to accelerate to steady slate before reaching the first location and with the second location displaced a predetermined distance further upstream thereof, means for measuring the pressure in the cylindrical enclosure means for measuring flow rate during the steady state interval between the first and second locations and calculation means for correcting for dynamic pressure changes during the measuring period between the two locations with the flow rate calculated based upon the correction for dynamic pressure in accordance with the following equation:

$$F_c = \frac{V_m}{\Delta t} \cdot \left[ \frac{P_2}{P_3} + \frac{P_2 - P_1}{P_3} \cdot R_v \right]$$

Where $P_2$=absolute pressure at end of timed period $P_1$=absolute pressure at start of timed period $P_3=P_1$ or an approximation thereof, or an arbitrary value corresponding to a standardizing pressure $\Delta t$=the timed period $V_m$=volume of measurement (change in volume during timed period $\Delta t$) and $R_v$=ratio of volumes $V_1/V_m$ wherein $V_1$=volume of inventory (dead volume space) or an approximation thereof, and $V_{lost}$=volume decrease due to pressure increase.

2. A positive displacement flowmeter as defined in claim 1 wherein said means for measuring the pressure in the cylinder comprises a silicon transducer adapted to read the internal pressure of the cylinder referenced to ambient or the outlet pressure.

3. A positive displacement flowmeter as defined in claim 1 wherein said means for measuring the pressure in the cylinder comprises a differential transducer adapted to read the difference in internal pressure on both sides of the piston.

4. A positive displacement flowmeter as defined in claim 1 wherein said means for measuring the pressure in the cylinder comprises a gauge transducer when the flowmeter outlet is vented to the atmosphere.

5. A method of measuring gas flow in a positive displacement piston flowmeter having an enclosure with opposite ends, an internal movable piston, means for permitting a gas, the flow of which is to be measured, into one end of the enclosure for moving the piston from a first position near one end of the enclosure toward the opposite end, detector means for detecting the movement of the piston between a first and second location along the enclosure with the first location positioned a distance upstream of the first position of the piston to permit the piston to accelerate to steady state before reaching the first location and with the second location displaced a predetermined distance further upstream thereof, and means for measuring the pressure in the enclosure comprising the steps of measuring the interval of time between the first and second locations, calculating the presence of a dynamic error, if any, during said interval of time in accordance with the following equation:

$$Error = \frac{(P_2 - P_1)}{P_1} \cdot \frac{Vm + Vd}{Vm}$$

Where $P_2$ and $P_1$ are the absolute pressures at the end and at the start of the timed interval, $V_m$ is the volume displaced during the timed interval and $V_d$ is the dead volume for the enclosure (the total contained volume between the flow source and the measured portion of the cylinder) and calculating the gas flow during said interval of time taking into account said dynamic error.

* * * * *